Patented Aug. 18, 1953

2,649,378

UNITED STATES PATENT OFFICE 2,649,378

METHOD FOR PRESERVING PIMENTO

Edwin Traisman, Des Plaines, Ill., and Claude R. Price, Garland, Tex., assignors to Kraft Foods Company, Chicago, Ill., a corporation of Delaware No Drawing. Application January 18, 1952, Serial No. 267,201

5 Claims. (Cl. 99—156)

The present invention relates generally to a method of preserving pimentos and, more specifically, to a method of producing preserved pimentos which have a firm texture and a bright, clear color.

Pimento, or pimientos, are the nearly ripe fruit of the plant *Capsicum annum* which is sometimes referred to as the Jamaica pepper or the Spanish pepper. The fruit, which is highly flavored, has found widespread use in the food industry as a condiment, for instance, it is added to cheeses such as American, Neufchatel, cream, etc., to form pimento cheese. This cheese is characterized by a red flecked appearance due to the particles of pimento interspersed in the body of the food product.

Since the pimento plant can be grown only in particular geographic locations and harvested during certain times of the year, it becomes necessary to preserve pimentos so that they can be stored until required for use. Heretofore, several processes have been employed to preserve pimentos, but each of the processes tends to transform the pimento from its original firm bodied state into a gelatinous mass of pimento pulp.

Probably the most commonly known process for preserving pimentos involves the step of sealing the pimentos in a small jar or can and heating the jar or can to sterilizing temperatures, e. g. 212° F. The sealed containers containing the pimentos are then maintained at that temperature for at least 75 minutes, which time is required to sterilize the pimento. After the containers have been cooled they can be stored for substantial lengths of time without causing any further deterioration of the pimento. While this process produces pimentos which are satisfactory for some purposes, the product is not entirely satisfactory for certain commercial operations. This is particularly true in the case of pimentos used in process cheese. Apparently, because of the high temperatures and long times required to sterilize the pimento in the process, the pimento loses its firm body and becomes gelatinous. When gelatinous pimentos are placed in cheese, there is not a sufficient number of discrete particles to produce an optimum flecked appearance. Moreover, the introduction of such a gelatinous mass adversely affects the body and texture of the cheese.

As has been pointed out, the pimentos in the "sterilization process" are sealed in cans, which usually have a small capacity, e. g. less than a quart, since it has been determined that if the pimentos are placed in larger containers and sterilized, that the pimento body becomes so gelatinous it is not useful for any purpose. As a consequence, in commercial operations where large amounts of pimentos are required, it becomes necessary to open a large number of small cans or jars and this requires considerable labor which increases the cost of the final product.

The other commonly used process for preserving pimentos involves soaking the pimentos in a relatively concentrated sodium chloride brine in a crock or vat fitted with a weighted cover which rides freely on the surface of the pimentos. The brined pimentos are then allowed to ferment at room temperatures until the pimentos no longer contain any sugar. This fermentation process takes from 3 to 4 weeks, after which the resultant product can be packed in barrels and be stored. This process is also not satisfactory for most purposes, since it reduces the amount of pimento solids to about 2 per cent. When preserved pimentos having such a low solids content are added to cheese, the body and texture of the cheese are also adversely affected.

The principal object of the present invention is the provision of an improved process for preserving pimentos so that they can be stored for substantial periods of time while retaining the clear, bright color of the raw fruit and without destroying their firm texture. A more specific object of the present invention is a provision of a process for preserving pimentos which are particularly adapted for use in making pimento cheese. Other objects and advantages of the invention will become known from the following description.

We have discovered that in order to preserve pimentos for prolonged periods of time, the acidity of the pimentos should be increased and it has been found that the pH of pimentos, which normally is between 4.9 and 5.0, should be below 4.6. While such adjustment of acidity may be accomplished by immersion of pimentos in an edible acid such as acetic acid or lactic acid, this procedure is unsatisfactory because it is generally necessary to rinse or wash the acid from the pimentos before they are used in food products and this is particularly the case when the pimentos are to be used in process cheese and other cheese products. However, such washing of the pimentos causes them to lose their body, color, and flavor so that the washed pimentos do not have the bright red color, firm body and full flavor when included in food products.

We have found, however, that the desired increase in acidity of the pimentos may be accomplished, so as to permit prolonged storage and at the same time provide a product which may be placed in food products without further processing after storage, the increase in acidity being accomplished by the addition of a neutral salt in a particular amount to the pimentos. More particularly, it has been found that the desired degree of acidification of the pimentos can be achieved by adding more than about 15 per cent by weight of sodium chloride to washed and diced pimentos, and heating the salt-pimento mixture to a pasteurizing temperature, but below 180° F., for a period of time which is sufficient to effect pasteurization. The amount of sodium chloride used should not exceed about 30 per cent of the weight of pimentos for the reason that increased amounts of salt make the pimentos unsatisfactory for use in food products without preliminary washing of the pimentos which washing inherently results in loss of body, color and flavor. Furthermore, additional amounts of salt in excess of about 30 per cent do not enhance the storing characteristics of the pimentos. We have found that most satisfactory results are obtained when the amount of sodium chloride used comprises 20 per cent of the weight of washed and diced pimentos.

After pasteurization, the pimentos may be placed in air-tight containers and stored for prolonged periods of time. Both after pasteurization and after storage, the pimentos had their characteristic bright red color, firm body, and flavor so that the acidification of the pimentos by sodium chloride addition not only made possible prolonged storage but also so-conditioned the pimentos as to cause them to retain their desired characteristics.

The following example will illustrate one particular manner of carrying out the process in accordance with the present invention.

Fresh pimentos, as picked from the vine, are first thoroughly washed, cleaned and peeled. The cleaned pimentos are then diced in conventional machinery to approximately ¼-inch cubes. The diced pimentos are then placed into jacketed kettles or cookers together with over about 15 per cent by weight, 20 per cent by weight being the preferred amount, of dry sodium chloride. The pimento-salt mixture is then rapidly and uniformly heated to a temperature of between about 140° F. to 165° F. and maintained at that temperature for at least 15 minutes. The mixture is then poured into air tight containers and allowed to cool.

Suitable containers for the purpose are 5 gallon fiber drums which are lined with envelopes or sacks fabricated from a film of rubber hydrochloride such as for example, a rubber hydrochloride film sold by Goodyear Rubber Tire Company under the trade mark of Pliofilm. Other plastic films such as polyethylene films, vinyl films, etc. may also be employed. After the envelopes are filled with the heated pimento-salt mixture, the envelopes are sealed, the drums are covered, and the contents allowed to cool. In carrying out the process, it is possible to place the pimento-salt mixture in the containers immediately after it reaches 140° F. to 165° F., relying on the time of cooling to effect pasteurization of the product.

Pimentos acidified by the addition of sodium chloride produces a product which has a clear bright red color, firm body, and can be introduced into food products without additional processing. Furthermore, the product can be maintained in storage, without refrigeration, for periods as long as 12 months or even longer.

The accomplishment of acidification of pimentos through the addition of the neutral salt sodium chloride is not understood and is wholly unexpected. Indeed, careful investigation has not disclosed any similar phenomena and, in order to make sure that such phenomena was not illusory, the pH measurements were made by two standard procedures. In the latter connection the acidity measurements were made by both electrometric and colorometric methods.

When pimentos, preserved in the manner described above, are placed in process cheese to produce a pasteurized process cheese, the cheese retains its original body characteristics. In addition, there are a substantially greater number of the characteristic red flecks produced by our improved pimentos for a given weight of added pimentos, than there are by the same weight of pimentos preserved by the prior art processes. This greatly enhances the appearance and marketability of the finished cheese.

Various features of the invention are set forth in the appended claims.

We claim:

1. The method of producing preserved pimentos which have a firm body, a bright red clear color, and full flavor which comprises lowering the pH of the pimentos below 4.6 by the addition of over about 15 per cent by weight of sodium chloride to clean pimentos, heating the pimento-salt mixture to a pasteurizing temperature, but below about 180° F., until the product is pasteurized, and packaging the pimento-salt mixture.

2. The method of producing pimentos which have a firm body, a bright red clear color, and full flavor which comprises cutting the pimentos into small cubes, lowering the pH of the pimentos below 4.6 by the addition of over about 15 per cent by weight of sodium chloride to the pimentos, heating the pimento-salt mixture to a pasteurizing temperature, but below about 180° F., until the product is pasteurized, and packaging the pimento-salt mixture.

3. The method of producing pimentos which have a firm body, a bright red clear color, and full flavor which comprises cutting the pimentos into small cubes, lowering the pH of the pimentos below 4.6 by the addition of between about 15 per cent and 30 per cent by weight of sodium chloride to the pimentos, heating the pimento-salt mixture to a temperature between about 140° F. and 165° F. for 15 minutes, and sealing the heated mixture in an airtight container.

4. The method of producing pimentos which have a firm body, bright red clear color, and full flavor which comprises cutting washed pimentos into cubes about one-quarter inch on a side, lowering the pH of the pimentos below 4.6 by the addition of about 20 per cent by weight of sodium chloride to the washed pimentos, heating the pimento-salt mixture to a pasteurizing temperature, but below about 180° F., until the product is pasteurized, and then sealing the heated mixture in an airtight container.

5. The method of producing pimentos which have a firm body, bright red clear color, and full flavor which comprises cutting washed pimentos into cubes about one-quarter inch on a side, lowering the pH of the pimentos below 4.6 by the addition of about 20 per cent by weight of sodium chloride to the washed pimentos, heating the pimento-salt mixture to a temperature between about 140° F. and 165° F. for 15 minutes, and sealing the heated mixture in an airtight container.

EDWIN TRAISMAN.
CLAUDE R. PRICE.

References Cited in the file of this patent

UNITED STATES PATENTS

| Number | Name | Date |
|---|---|---|
| 1,829,932 | Hey | Nov. 3, 1931 |
| 1,889,123 | Jones | Nov. 29, 1932 |
| 2,322,880 | Pollak | June 29, 1943 |
| 2,444,875 | Hayes | July 6, 1948 |